United States Patent [19]
Matsumura

[11] Patent Number: 5,906,412
[45] Date of Patent: May 25, 1999

[54] SLIDING CONSTRUCTION FOR A SUNROOF

[75] Inventor: Mitsuyoshi Matsumura, Higashi-Hiroshima, Japan

[73] Assignee: Webasto Karosseriesysteme GmbH, Stockdorf, Germany

[21] Appl. No.: 08/839,669

[22] Filed: Apr. 15, 1997

[30]     Foreign Application Priority Data

Apr. 15, 1996  [JP]  Japan .................................. 8-092686

[51] Int. Cl.$^6$ ................................................. B60J 7/057
[52] U.S. Cl. ................ 296/223; 296/216.07; 296/216.08
[58] Field of Search ......................... 296/216.07, 216.08, 296/223

[56]            References Cited

U.S. PATENT DOCUMENTS

| | | | |
|---|---|---|---|
| 4,364,601 | 12/1982 | Katayama et al. ...................... | 296/223 |
| 4,650,243 | 3/1987 | Hanley et al. ........................... | 296/223 |
| 4,688,848 | 8/1987 | Niwa ....................................... | 296/223 |
| 4,690,452 | 9/1987 | Niwa ....................................... | 296/223 |
| 4,923,246 | 5/1990 | Takahashi et al. ...................... | 296/223 |
| 4,995,665 | 2/1991 | Ichinose et al. .................... | 296/216.08 |
| 5,188,420 | 2/1993 | Maeda et al. ............................ | 296/223 |
| 5,344,209 | 9/1994 | Regner .................................... | 296/223 |

FOREIGN PATENT DOCUMENTS

| | | | |
|---|---|---|---|
| 3607-724-C | 8/1987 | Germany ................................ | 296/223 |
| 3-6496 | 2/1991 | Japan . | |
| 5-11690 | 3/1993 | Japan . | |

*Primary Examiner*—Joseph D. Pape
*Assistant Examiner*—Kiran Patel
*Attorney, Agent, or Firm*—Sixbey, Friedman, Leedom & Ferguson; David S. Safran

[57]            ABSTRACT

To provide a sliding construction for a sunroof which is capable of absorbing dimensional errors between a guide rail and a slider, preventing a panel from vertically and transversely vibrating, and allowing the panel to slide with a decreased sliding resistance, while avoiding any disadvantages, such as deformation even under a load, according to preferred embodiments, a sliding construction for a sunroof of the type having an opening formed in a fixed vehicle roof which is opened and closed by a cover panel which is supported on a guide rail having a longitudinally extending guide groove by at least one slider that is slidably disposed in the guide groove has the slider transversely movably fitted over a slider mounting portion of the cover panel. At least one of the slider and the guide groove have a sliding face with an inclined surface which slopes toward a vertical center of the guide groove in a direction into the guide groove, and at least one elastic member elastically presses the slider into the guide groove, such that opposing sliding faces come into contact with each other.

10 Claims, 4 Drawing Sheets

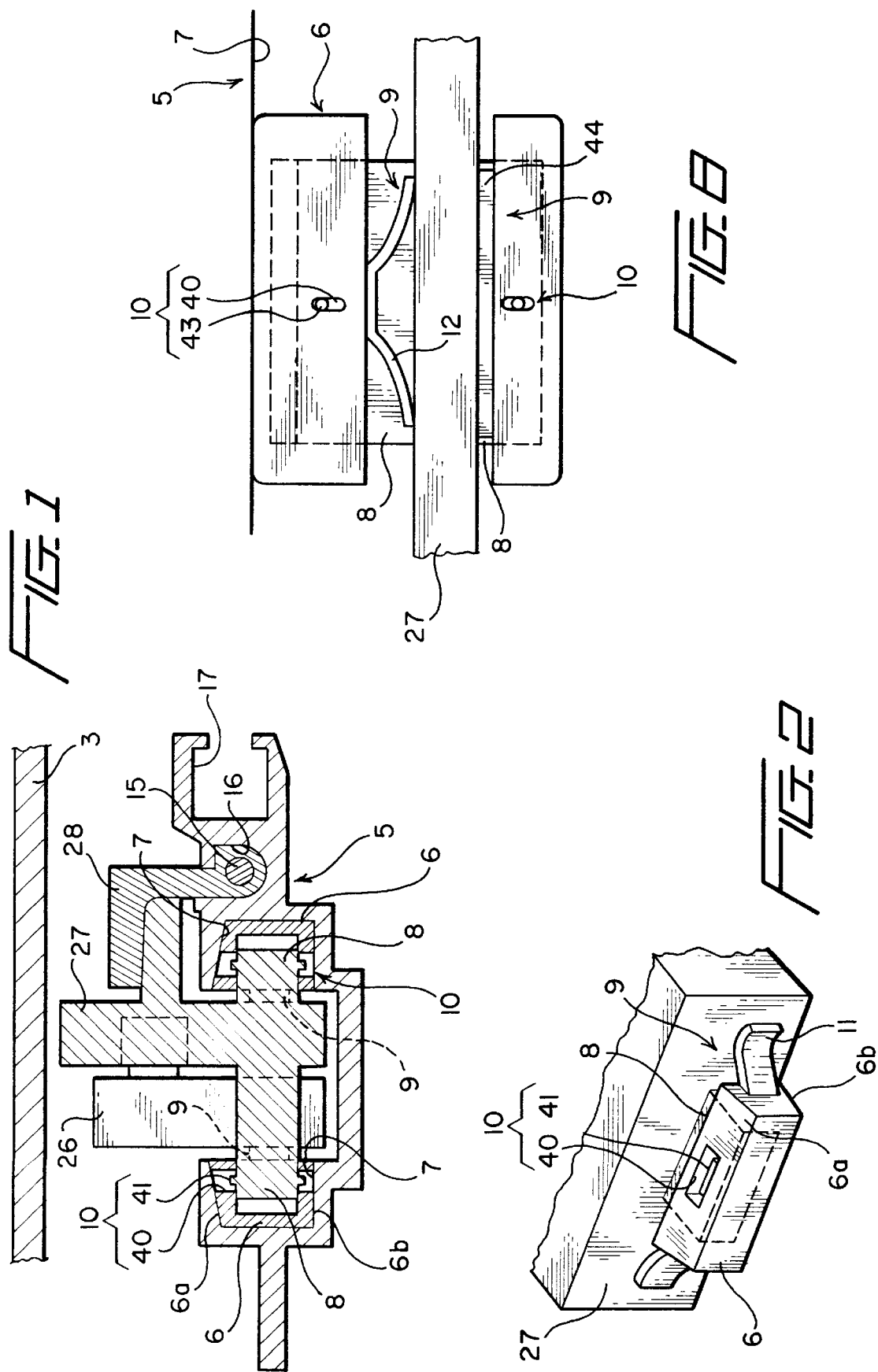

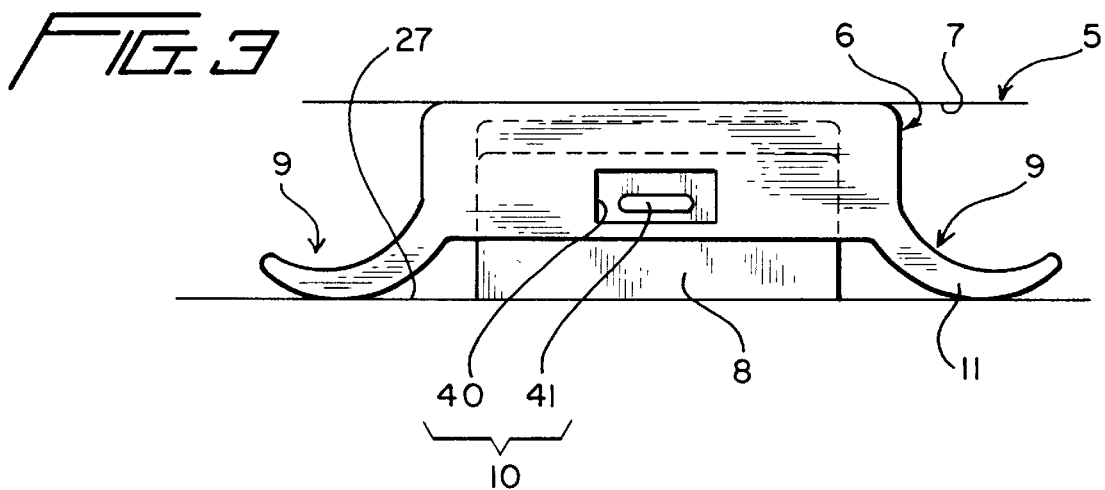
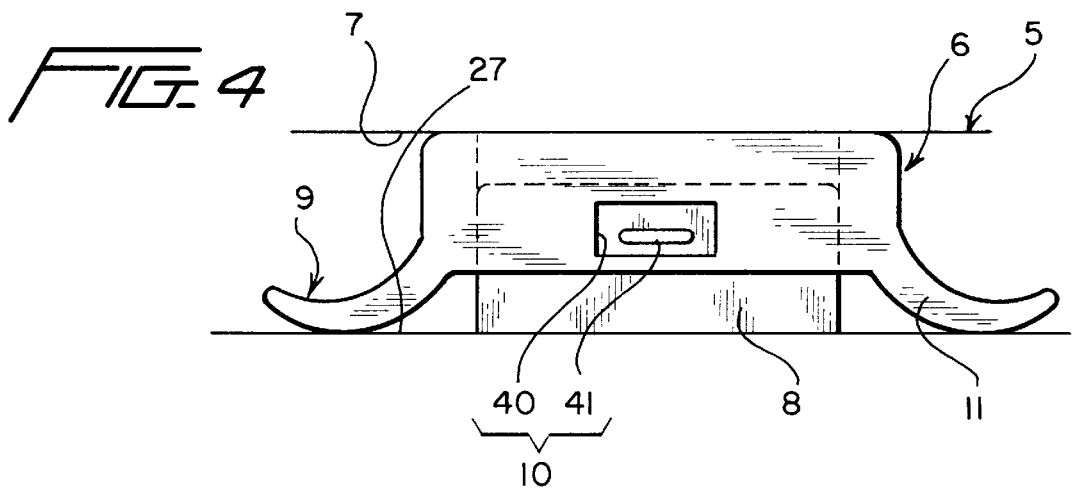
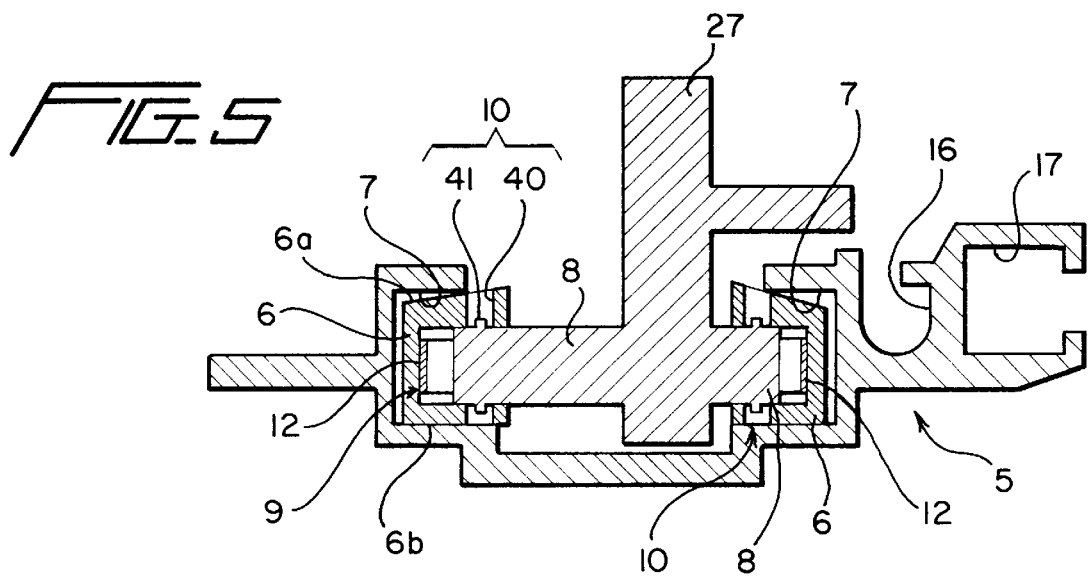

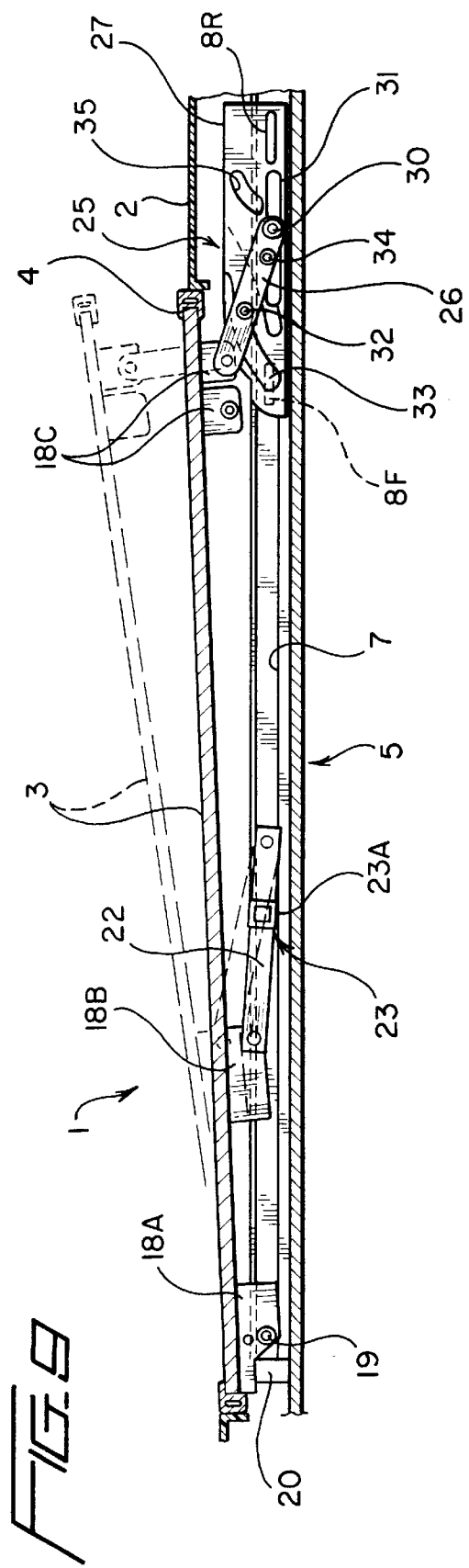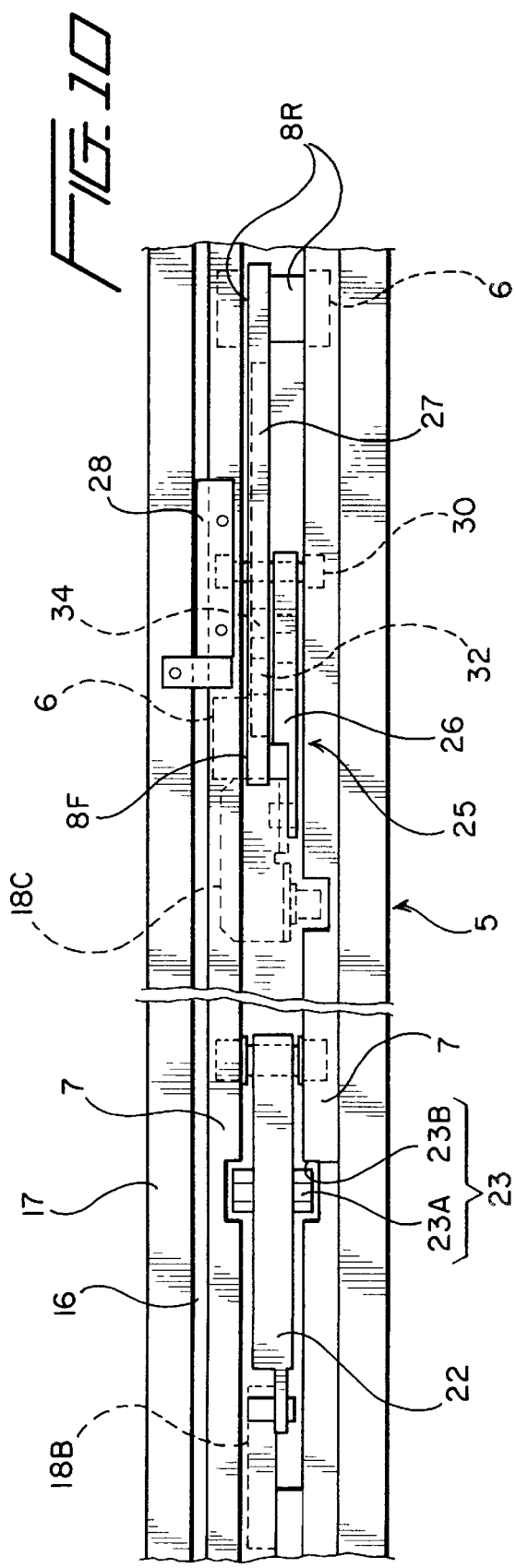

SLIDING CONSTRUCTION FOR A SUNROOF

BACKGROUND OF THE INVENTION

1. Field of the Invention

The present invention relates to a sliding construction for a sunroof which slidably supports a panel which is movable to open and close an opening in a fixed vehicle roof.

2. Description of Related Art

Japanese Examined Utility Model Publication HEI 5-11690 discloses a prior art construction of the initially mentioned type in which a vehicle roof defines an opening that is opened and closed with a panel that is supported on its lateral sides on a guide rail having a longitudinally extending guide groove via a slider which is slidably disposed in the guide groove. The slider is transversely movably fitted over a slider mounting portion of the panel, and an elastic pressure means is provided for elastically pressing the slider deeper into the groove. The slider has a face with an uneven surface that slides on a sliding face of the guide groove of the guide rail, with that the uneven surface pressed against the sliding face of the guide groove.

Japanese Examined Utility Model Publication No. HEI 3-6496 discloses another prior art construction in which a slider is formed with an elastic piece having a substantially triangular tip secured to the slider mounting portion of the panel. The elastic piece is pressed into a substantially triangular guide groove of the guide rail.

With the first mentioned prior art construction, the uneven surface forming the sliding face of the slider is pressed against the corresponding sliding face of the guide groove of the guide rail, so that vertical jolting is unlikely in an unloaded condition. Further, since the slider is in contact with a surface of the guide rail situated deep within the guide groove, the panel is well positioned in the transverse direction. When a load, such as a torsional load, is imposed, however, it is difficult to prevent a back and forth shaking of the panel. In addition, the slider has a sliding face extending lengthwise in a direction perpendicular to the sliding direction, thereby producing an increased sliding resistance.

With the second mentioned construction, the elastic piece having a triangular tip pressed into the triangular groove of the guide rail can prevent even slight vertical and longitudinal jolting. However, since the elastic piece is secured to the slider mounting portion of the panel and is pressed against the groove, a large sliding resistance is imposed created thereby, so that positional setting of the elastic piece is difficult and difficulties are encountered in transversely positioning the panel. If manufacturing errors in the transverse direction of the groove cause the elastic piece to shift transversely, vertical and longitudinal shaking occurs. In addition, the shock absorbing function of the contact between the elastic piece and the inclined surface of the groove becomes less effective.

SUMMARY OF THE INVENTION

In view of the foregoing problems of the prior art devices, an important object of the present invention is to provide a sliding construction in which the occurrence of vertical and transverse vibration of the panel is minimized by absorbing dimensional errors between the guide rail and the slider, in which disadvantages, such as deformation, will not occur even under a load, such as a torsional force, and in which sliding resistance is decreased.

This object and others are attained in accordance with preferred embodiments of the present invention by the provision of a sliding construction in which the slider is transversely movably fitted over the slider mounting portion of the panel and is prevented from slipping off therefrom, an upper sliding face of at least one of the slider and the groove of the guide rail comprises an inclined surface such that the groove narrows inwardly toward a center plane of the guide groove in a direction into the groove, and the slider is pressed into the groove of the guide rail, whereby dimensional errors between the guide rail and the slider are absorbed with the lower sliding face of the groove of the guide rail serving as a reference, the panel is prevented from vertically and transversely vibrating. As a result, disadvantages, such as deformation, will not take place even under a load such as a torsional force, and sliding resistance is decreased.

Furthermore, by providing a sliding construction in which a pair of right and left slider mounting portions protrude from a guiding element attached to the panel and are guided by a pair of right and left guide grooves of a guide rail, respectively, vibration and torsion of the panel and like disadvantages can be more effectively prevented.

Additionally, by providing a sliding construction in which an elastic pressure means comprises an elastic tongue-like element that protrudes from the slider, or a plate spring that is interposed between the slider and the slider mounting portion, the elastic pressure means can be formed simply and easily.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a sectional front view showing the first embodiment of the present invention;

FIG. 2 is a perspective view of a principal part of the first embodiment;

FIG. 3 is a plan view of the principal part;

FIG. 4 is a plan view showing the second embodiment of the present invention;

FIG. 5 is a sectional front view showing the third;

FIG. 8 is a plan view of a principal part of the fourth embodiment;

FIG. 9 is a longitudinal sectional view showing a sunroof to which the present invention is applicable; and FIG. 10 is a plan view of a side portion of the sunroof of FIG. 9.

DETAILED DESCRIPTION OF THE PREFERRED EMBODIMENTS

Figure 6:
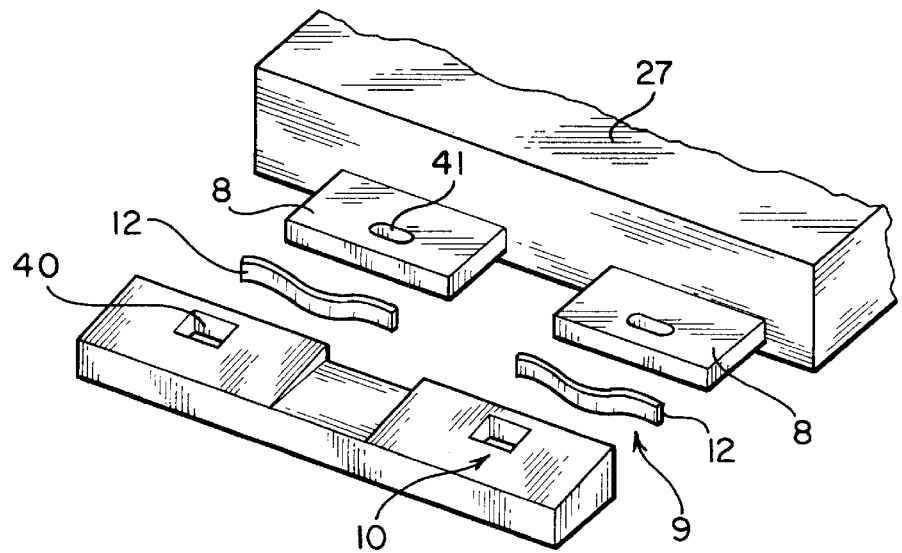
FIG. 6 is an exploded perspective view of a principal part of the third embodiment.

In FIGS. 1, 9 and 10, reference numeral 1 denotes a sunroof mounted on a roof 2 of a vehicle such as an automobile, the sunroof 1 being so constructed that an opening 4 is defined in a fixed roof 2 can be opened and closed by tilting and sliding of a cover panel 3.

Reference numeral 5 denotes longitudinally elongate guide rails disposed on the right and left sides of the opening 4 which are secured to a frame which is, in turn, secured to the fixed roof 2. The right and left guide rails 5 are each formed with a pair of guide grooves 7 for guiding the cover panel 3, a cable guide portion 16 through which a cable 15 extends, and a guide portion 17 for guiding a sunshade, and the like.

The panel 3 is formed of glass, a synthetic resin or a metal and has a weather strip affixed therearound. A front support 18A, an intermediate support 18B and a rear support 18C are fixed to each of right and left portions of the underside of the panel 3, either directly or through a bracket.

The front support 18A has a front support portion 19 which serves as a fulcrum for tilting movement of the cover panel 3. The front support portion 19 has sliding elements on opposite sides thereof which longitudinally slidably engage the corresponding guide grooves 7 of each guide rail 5 and which can abut against a front stopper 20 of the guide rail 5.

The intermediate support 18B pivotally supports the front end of a movement restricting member 22, the rear end of which is longitudinally slidably engaged by the guide grooves 7 of the guide rail 5. A movement restricting means 23 is formed between the guide rail 5 and the movement restricting member 22.

The movement restricting means 23 comprises a projecting engagement portion 23A disposed in an intermediate portion of the movement restricting member 22 and an engagement notch portion 23B formed in the guide rail 5. When the panel 3 is in a position ranging from a substantially closed position (shown in solid line in FIG. 9) to an upwardly tilt, raised position (shown in double-dot broken line in FIG. 9), the projecting engagement portion 23A and the engagement notch portion 23B engage each other so as to restrict back and forth movements of the panel 3, thereby preventing the panel 3 from vibrating.

Between the rear support 18C and the guide rail 5 is disposed a rise/fall drive mechanism 25 having a lifter 26 that is connected by a pin to the rear support 18C at the front upper end thereof and a guide member 27 that causes the front portion of the lifter 26 to move vertically.

The guide member 27 is provided with a slider mounting portion 8F protruding either to the right or to the left at a front portion thereof and with a slider mounting portion 8R protruding both to the right and to the left at a rear portion thereof. The slider mounting portions 8F and 8R are fitted into corresponding sliders 6 which, in turn, longitudinally slidably engage the pair of right and left guide grooves 7 of the guide rail 5.

To one side of the guide member 27 is secured a connecting member 28 which is coupled with the cable 15 extending through the cable guide portion 16. By push-pull operation of the cable 15, either manually or with a drive device such as a motor (not shown), the guide member 27 is moved back and forth.

The guide member 27 has a straight groove 31 therein for guiding a rear end pin 30 of a cover lifter 26, a first rise/fall groove 33 for guiding an intermediate front pin 32 of the cover lifter 26, and a second rise/fall groove 35 for guiding an intermediate rear pin 34. By moving the guide member 27 forward, the panel 3 is raised from a tilt lowered position (not shown) below the closed position to upwardly beyond the closed position by the use of the first rise/fall groove 33. The cover panel 3 is raised further into the tilt raised position by the use of the second rise/fall groove 35.

In the sunroof 1, when the guide member 27 is moved rearward from the position at which the panel 3 is in the tilt raised position, the panel 3 can be brought into the tilt lowered position, passing through the closed position, and when the guide member 27 is then moved further rearward, the panel 3 is moved into its fully opened position in which it is retracted under the fixed roof 2 while being maintained in a tilt lowered posture.

In the first embodiment shown in FIGS. 1 to 3, the sliders 6 are each formed of a synthetic resin and have a box-like shape. Each of the sliders 6 is fitted over a respective one of the slider mounting portions 8 that protrude from the guide member 27, to the right and left, in a manner permiting relative transverse movement (in the widthwise direction of the guide rail 5).

Each slider 6 has an opening 40 in at least one of upper and lower sliding faces 6a, 6b thereof into which a projection 41 projects from the respective slider mounting portion 8. The opening 40 and the projection 41 form a slider slip-off preventive means 10 for preventing the slider 6 from slipping off of its mounting portion 8, while permitting the slider 6 to transversely move within a given range. The projection 41 is fitted into the opening 40 utilizing elastic deformation of the slider 6.

The upper sliding face 6a of the slider 6 has an inclined surface that gradually slopes downward in a direction into the corresponding guide groove 7 of the guide rail 5 (i.e., in a direction toward a vertical center line of the guide groove 7 in a depthwise direction of the groove 7). The upper sliding face formed on the upper wall of the guide groove 7 slopes downward in a similar manner so that the groove 7 gradually becomes narrower in width in a direction into the groove. Thus, the upper sliding face 6a of the slider 6 and the upper sliding face of the groove 7 are in planar contact with each other.

In each guide rail 5, the portion in which each guide groove 7 is formed is of a cross-sectional shape that corresponds substantially to the shape of a U laid on its side, and only the upper sliding face of the upper wall of the guide rail 5 which is in sliding contact with the upper sliding face 6a is inclined. However, the sloping of the upper wall of the guide rail 5 obtained by a tapering of its thickness in the illustrated embodiment may be also obtained using an inclined having a uniform thickness.

The box-like portion of the slider 6 has front and rear portions, each of which has an integral tongue-like element 11 of an arcuate shape that abuts against a side face of the guide member 27 to serve as an elastic pressure means 9 for elastically pressing the box-like portion of the slider 6 transversely outward, thereby elastically pressing the slider 6 into the depth of the respective guide groove 7.

Thus, the upper and lower sliding faces 6a and 6b are in planar contact with the upper and lower sliding faces, respectively, of the corresponding guide groove 7 of each guide rail 5. Even if there are manufacturing errors in the vertical width, the depth and the like of the guide groove 7, the elastic pressure means 9 allows the slider 6 to be positionally adjusted in the transverse direction. Further, since the opposing upper sliding faces and the opposing lower sliding faces of the guide rail 5 and slider 6, respectively, can be in sliding contact with each other along their length by applying an appropriate elastic pressure thereto, with the lower sliding face 6b serving as a reference, the panel 3 can be opened and closed while maintaining a high positional precision both vertically and transversely.

FIG. 4 shows a second embodiment in which the slider 6 is shaped into a hollow cylinder of square cross-sectional shape having an internal space extending therethrough. This construction is effective to provide a slider having a smaller transverse width, particularly where the guide member 27 is situated close to the guide groove 7 of each guide rail 5. In this case, the costs for the manufacturing and materials are less expensive.

FIGS. 5 and 6 illustrate a third embodiment in which the upper sliding face 6a of each slider 6 comprises an inclined surface, while on the other hand, the upper and lower walls of the respective guide groove 7 of each guide rail 5 are parallel. Thus, the upper sliding face of the guide groove 7 makes contact with the upper sliding face 6a of the slider 6 along a longitudinal line of contact.

Further, each slider mounting portion 8 is longitudinally divided into two parts, and the counterpart slider 6 is formed correspondingly thereto of a two body construction. The elastic pressure means 9, in this case, comprises, a waved plate spring 12 interposed between the inner wall of the slider 6 and the edge face of each slider mounting portion 8, instead of providing elastic tongue-like elements 11.

With the third embodiment, the slider 6 has a longitudinally elongated face in contact with the corresponding guide groove 7, so that it is possible to prevent the panel 3 from transversely vibrating more effectively and to avoid distortion due to a load, such as a torsional force, thereby ensuring smooth sliding.

Figure 7:
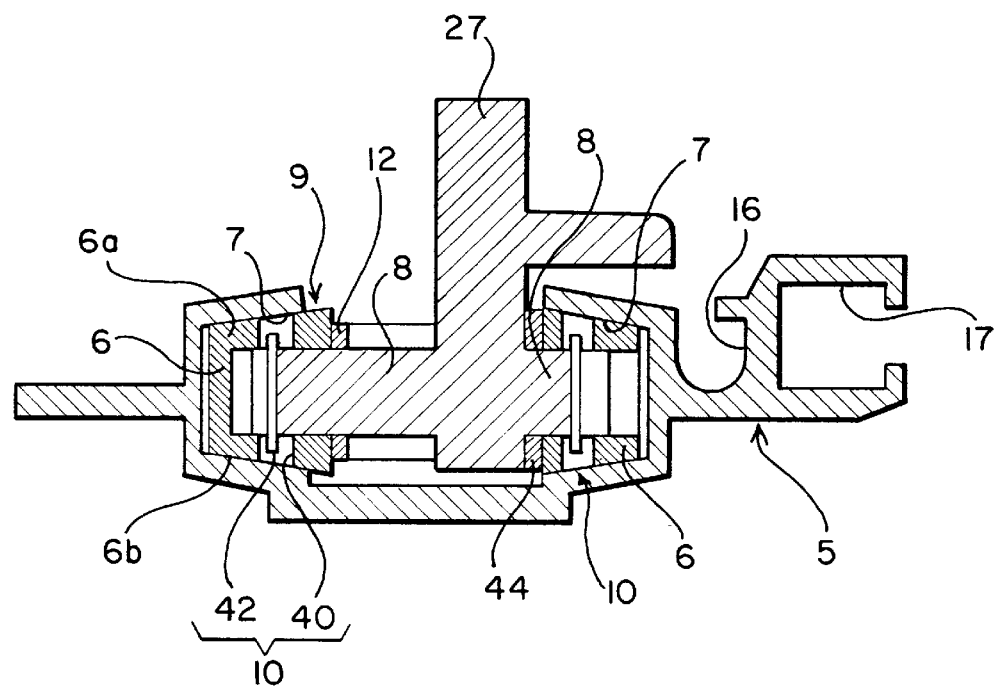
FIG. 7 is a transverse sectional view of a fourth embodiment of the invention.

FIGS. 7 and 8 illustrate a fourth embodiment in which the upper and lower sliding faces 6a and 6b of each slider 6 and the respective upper and lower sliding faces formed on the upper and lower walls of the associated guide groove 7 are all inclined, and the slider slip-off preventive means 10 comprises a slot-like opening 40 defined in each slider 6, and a pin 43, such as a roll pin, vertically extending through the corresponding slider mounting portion 8 so as to be fitted into the opening 40.

Further, a plate spring 12, serving as the elastic pressure means 9, is interposed between the guide member 27 and the slider 6 that is spaced a substantially from the guide member 27, i.e., that on the left in FIG. 7. On the other hand, a rubber member 44 serving as the elastic pressure means 9 is interposed between the guide member 27 and the other slider 6 which situated relatively close to the guide member 27 (shown on the right in FIG. 7).

With the fourth embodiment, it is possible to set the reference height for the panel 3 to coincide with the vertical center of the guide grooves 7, whereby larger dimensional errors can be absorbed.

It should be understood that the present invention is not limited to the foregoing embodiments, and these embodiments can be modified variously; for example, the features of the first to fourth embodiments can be combined appropriately, and the sunroof 1 may be of the type adapted to assume the full open position by rearwardly moving the panel in an upwardly tilted and raised posture, known as a spoiler roof, or of another type. In fact, the widthwise self-adjusting slider construction in accordance with the present invention will find applicability to most known types of sunroofs, being independent of the type of drive and raising, lowering and/or retracting mechanisms used.

The rise/fall drive mechanism 25 may be of the type wherein a rise/fall cam groove is provided in a support member secured to the panel 3, and a slider in sliding contact with the corresponding guide rail 5 is provided with an engaging portion adapted to move along the rise/fall cam groove, or of another type. The guide member including the slider 6 may be such a slider provided with the engaging portion. Further, the slider 6 may be disposed only on one of the right and left sides of the guide member.

Additionally, it is possible that only the lower sliding face 6b of each slider 6 and the lower sliding face formed on the lower wall of the corresponding guide groove 7 each comprise an inclined surface. The elastic pressure means 9 and the slider slip-off preventive means 10 may be each constructed differently. Where sliders 6 are disposed on the right and left sides of the guide member, an arrangement may be employed such that one side of the guide member is not provided with the elastic pressure means 9, while the other side of the guide member is not provided with the slider slip-off preventive means 10 or like means.

From the foregoing is should apparent that the embodiments of the present invention provide a sliding construction for a sunroof with which dimensional errors between the guide rail (5) and the slider (6) can be absorbed, the panel (3) can be prevented from vibrating vertically and transversely, and the slider (6) can slide with a decreased sliding resistance and without being deformed even under a load.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. A sliding construction for a sunroof having an opening formed in a fixed vehicle roof which is opened and closed by a cover panel which is supported by a guide member on a guide rail having a longitudinally extending guide groove by at least one slider that is slidably disposed in the guide groove; wherein the slider has opposing sliding faces which are transversely movably fitted over opposing sliding faces of a slider mounting portion of the guide member; at least one of the sliding faces having an inclined surface which slopes toward a vertical center plane of the guide groove in a direction into the guide groove; and an elastic pressure means for elastically pressing the slider into the guide groove, such that the opposing sliding faces of the slider and guide groove come into contact with each other.

2. A sliding construction for a sunroof according to claim 1, further comprising a slider slip-off prevention means for preventing the slider from slipping off of the slider mounting portion, said slider slip-off prevention means being provided between the slider and the slider mounting portion; wherein the at least one sliding face having an inclined surface is an upper sliding face of at least one of the slider and the guide groove which is inclined downward in a direction into the guide groove.

3. A sliding construction for a sunroof as set forth in claim 1, wherein a guide member is attached to each of opposite lateral sides of the cover panel for supporting the cover panel in a guide rail on each of opposite lateral sides of the roof opening; wherein a pair of right and left slider mounting portions protrude from opposite sides of each guide member; wherein each mounting portion fits into a respective slider; and wherein each guide rail has a pair of right and left guide grooves in sliding contact with the respective slider of the right and left slider mounting portions.

4. A sliding construction for a sunroof as set forth in claim 3, wherein the right and left slider mounting portions protrude different distances from opposite sides of each guide member; wherein the elastic pressure means comprises a plate spring interposed between the slider and the slider mounting portion at a first side of the guide member and an elastic pad at a second side of the guide member, the slider mounting portion protruding a shorter distance at said second side that at said first side.

5. A sliding construction for a sunroof as set forth in claim 1, wherein the elastic pressure means comprises an elastic tongue-shaped element which protrudes from the slider for elastically pressing onto the slider mounting portion.

6. A sliding construction for a sunroof as set forth in claim 1, wherein the elastic pressure means comprises a plate spring interposed between the slider and the slider mounting portion.

7. A sliding construction for a sunroof as set forth in claim 1, wherein the at least one sliding face having an inclined surface is a sliding face of at least one of upper and lower sides of both the slider and the guide groove.

8. A sliding construction for a sunroof as set forth in claim 1, wherein the at least one sliding face having an inclined surface is a sliding face of both of upper and lower sides of both the slider and the guide groove.

9. A sliding construction for a sunroof as set forth in claim 1, wherein the at least one sliding face having an inclined surface is a sliding face of only the slider.

10. A sliding construction for a sunroof as set forth in claim 1, wherein the at least one sliding face having an inclined surface is a sliding face of only the guide groove.

* * * * *